United States Patent
Vranceanu et al.

(10) Patent No.: US 10,511,786 B2
(45) Date of Patent: Dec. 17, 2019

(54) IMAGE ACQUISITION METHOD AND APPARATUS

(71) Applicant: FotoNation Limited, Galway (IE)

(72) Inventors: Ruxandra Vranceanu, Bucharest (RO); Razvan G. Condorovici, Bucharest (RO)

(73) Assignee: FotoNation Limited, Galway (IE)

( * ) Notice: Subject to any disclaimer, the term of this patent is extended or adjusted under 35 U.S.C. 154(b) by 0 days.

(21) Appl. No.: 16/102,510

(22) Filed: Aug. 13, 2018

(65) Prior Publication Data

US 2019/0045105 A1  Feb. 7, 2019

Related U.S. Application Data

(63) Continuation of application No. 15/099,057, filed on Apr. 14, 2016, now Pat. No. 10,051,197.

(60) Provisional application No. 62/147,464, filed on Apr. 14, 2015.

(30) Foreign Application Priority Data

Apr. 4, 2016  (WO) ................ PCT/EP2016/057317

(51) Int. Cl.
*H04N 5/235* (2006.01)
*G06T 5/20* (2006.01)
*G06T 5/40* (2006.01)

(52) U.S. Cl.
CPC ............. *H04N 5/2355* (2013.01); *G06T 5/20* (2013.01); *G06T 5/40* (2013.01); *H04N 5/2351* (2013.01); *H04N 5/2354* (2013.01); *G06T 2207/10016* (2013.01); *G06T 2207/20208* (2013.01)

(58) Field of Classification Search
None
See application file for complete search history.

(56) References Cited

U.S. PATENT DOCUMENTS

| | | |
|---|---|---|
| 8,687,087 B2 | 4/2014 | Pertsel et al. |
| 8,724,921 B2 | 5/2014 | Jin |
| 2003/0161549 A1* | 8/2003 | Lei .......................... G06T 5/009 382/274 |

(Continued)

FOREIGN PATENT DOCUMENTS

WO   WO2008018887   2/2008

OTHER PUBLICATIONS

Gurieva, "Complete Digital Workflow for HDR Photography" International Circular of Graphic Education and Research; No. 7—2014; pp. 14-23.

(Continued)

*Primary Examiner* — Mark T Monk

(57) ABSTRACT

An image acquisition method operates in a hand held image acquisition device with a camera. A first image of a scene is obtained with the camera at a nominal exposure level. A number of relatively bright pixels and a number of relatively dark pixels within the first image are determined. Based on the number of relatively bright pixels, a negative exposure adjustment is determined and based on the number of relatively dark pixels, a positive exposure adjustment is determined. Respective images are acquired at the nominal exposure level; with the negative exposure adjustment; and with the positive exposure adjustment as component images for high dynamic range (HDR) image of the scene.

20 Claims, 3 Drawing Sheets

(56) References Cited

U.S. PATENT DOCUMENTS

2007/0086767 A1\* 4/2007 Nakai .................. G03B 13/34
                                                          396/101
2014/0002694 A1   1/2014 Levy et al.
2014/0022408 A1\* 1/2014 Nashizawa .......... H04N 5/2355
                                                         348/222.1

OTHER PUBLICATIONS

Non-Final Office Action dated Jun. 21, 2017 from U.S. Appl. No. 15/099,057 by Ruxandra Vranceanu, 15 pp.
Final Office Action dated Nov. 1, 2017 from U.S. Appl. No. 15/099,057 by Ruxandra Vranceanu, 17 pp.

\* cited by examiner

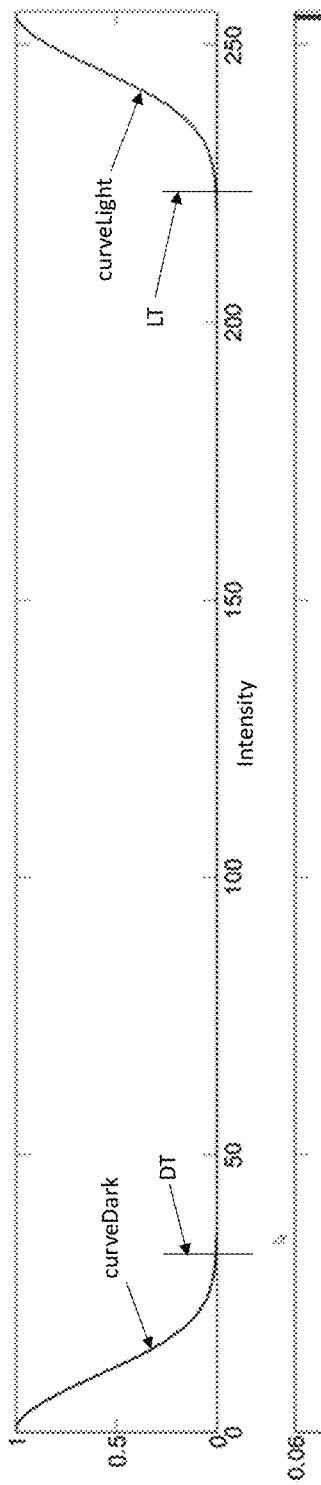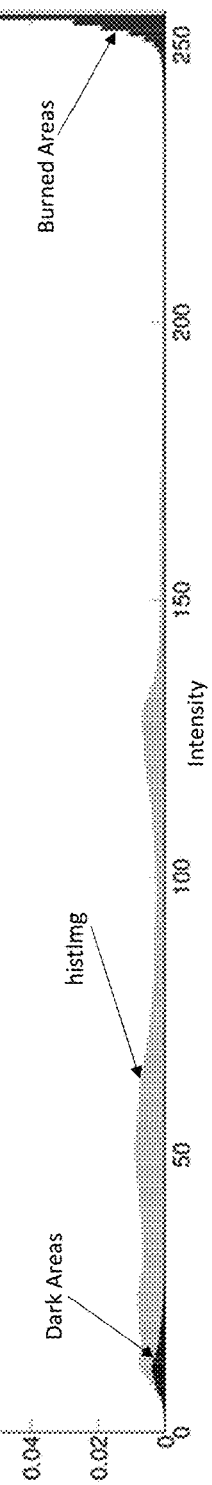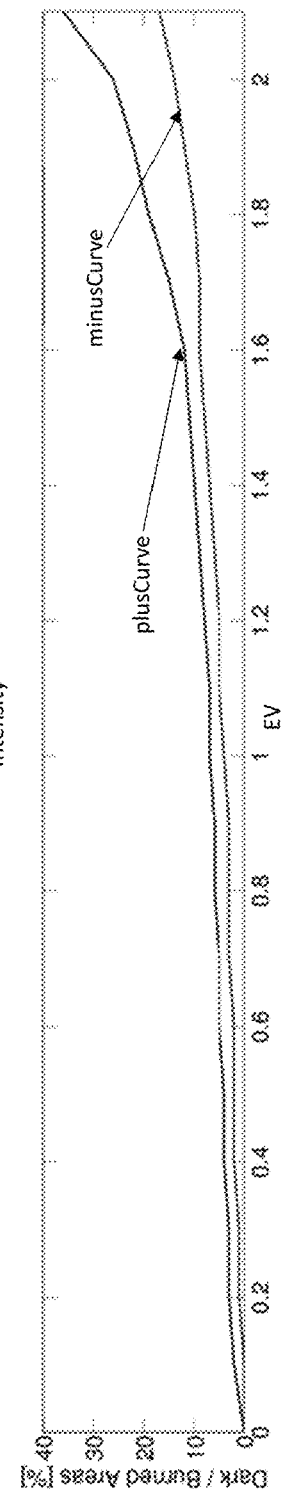

IMAGE ACQUISITION METHOD AND APPARATUS

CROSS REFERENCE TO RELATED APPLICATIONS

The present application is a U.S. Non-Provisional Patent Application claiming the benefit of priority of U.S. Provisional Patent Application No. 62/147,464, filed on Apr. 14, 2015, the content of which is expressly incorporated by reference herein in its entirety.

FIELD

The present invention relates to an image acquisition method and apparatus.

BACKGROUND

High-dynamic-range (HDR) photographs are typically generated by acquiring multiple component images of a scene, each with different exposure levels, and then later, merging the component images into a single HDR image.

Some prior art approaches can involve acquiring a set of, for example, 8 component images, across a range of different exposure levels to ensure that appropriately exposed image information is available for all regions of a HDR image. However, this can involve significant delay in acquiring the component images and so can result in blurring or ghosting artefacts from one image to the next. It can also require a large amount of processing to handle the set of component images.

U.S. Pat. No. 8,724,921, Aptina, discloses a method for capturing a high dynamic range (HDR) image. Multiple component images of a scene are captured at respectively different exposure settings. A further image of an object placed in the scene is captured at one exposure setting. A first radiance image is formed from the multiple component images. A second radiance image is formed from the further image. The first radiance image and the second radiance image are merged to form the HDR image.

Natalia Gurieva "*Complete Digital Workflow for HDR Photography*", International Circular of Graphic Education and Research, No. 7, 2014, pp 14-23 discloses capturing a HDR image including conducting a dynamic range evaluation of the scene. Depending on the type of the scene and its dynamic range, different capturing strategies can be applied. For example, in case of midday sun with strong shadows it will be enough to take 3 shots at about 1 to about 1.33 stops apart; inside buildings with some light coming through the windows at least 5 bracketed shots at about 2 stops apart have to be taken.

U.S. Pat. No. 8,687,087, CSR Tech discloses a different approach to capturing an image of a scene which would require high dynamic range including adjusting exposure time on an image block by block basis to maintain a resulting digital signal within a range carried by a digital processing path that carries a limited number of bits.

US 2014/0002694, CSR Tech discloses capturing two or more image frames using different exposure settings and then combining the images to form a single HDR output frame in a video sequence. A pipelined architecture operates on adjacent image frames by performing image alignment, image mixing and tone mapping on the adjacent image frames to generate the HDR image sequence.

It is an object of the present invention to provide an efficient technique for determining appropriate exposure levels for a limited number of component images used to provide a HDR image.

SUMMARY

According to a first aspect of the present invention there is provided an image acquisition method disclosed herein.

In still further aspects there is provided an image acquisition device arranged to perform the methods disclosed herein.

Separately, there is provided a non-transient computer readable medium comprising computer executable instructions, which instructions when executed on an image acquisition device, cause the image acquisition device to perform the methods disclosed herein.

BRIEF DESCRIPTION OF THE DRAWINGS

Various embodiments of the invention will now be described, by way of example, with reference to the accompanying drawings, in which:

FIG. 3(a) illustrate thresholding curves employed in the method of FIG. 2;

FIG. 3(b) shows exemplary image data combined with the thresholding curves of FIG. 3(b); and FIG. 3(c) illustrates exposure value conversion curves employed in the method of FIG. 2.

DESCRIPTION OF THE PREFERRED EMBODIMENTS

Figure 1:
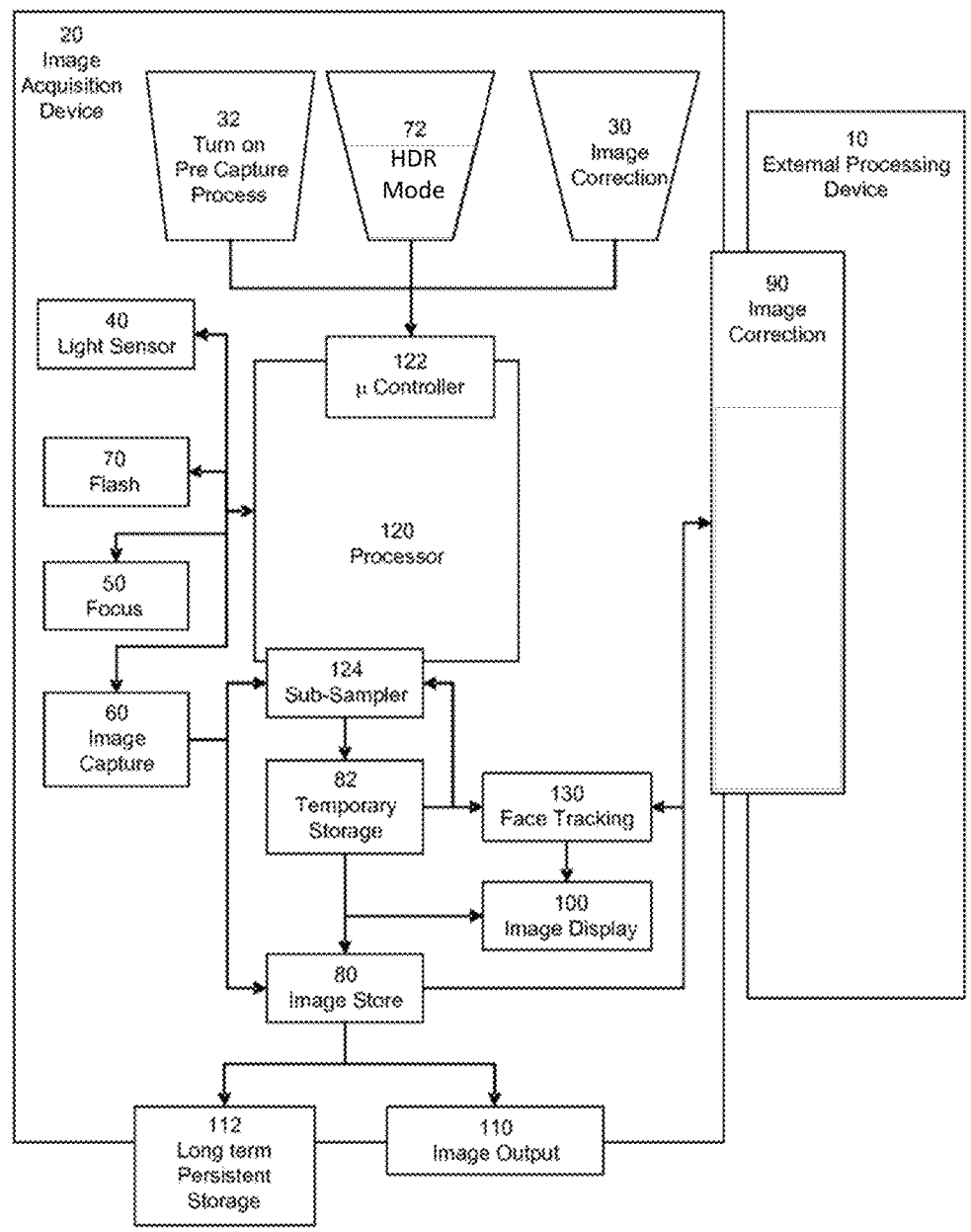
FIG. 1 is a block diagram of an image acquisition device on which embodiments of the present invention can be implemented.

Referring now to FIG. 1 which is a block diagram of an image acquisition device 20, which in the present embodiment is a portable digital camera, operating in accordance with certain embodiments. It will be appreciated that many of the processes implemented in the digital camera are implemented in or controlled by software operating on a microprocessor, central processing unit, controller, digital signal processor and/or an application specific integrated circuit, collectively depicted as processor 120. All user interface and control of peripheral components such as buttons and display is controlled by a microcontroller 122.

In operation, the processor 120, in response to a user input at 122, such as half pressing a shutter button (pre-capture mode 32), initiates and controls the digital photographic process. Ambient light exposure can be determined using a light sensor 40 in order to automatically determine an exposure setting for image acquisition. The distance to the subject is determined using a focusing mechanism 50 which also focuses the image on an image capture device 60. In a flash mode of the device, the processor 120 can cause a flash device 70 to generate a photographic flash in substantial coincidence with the recording of the image by the image capture device 60 upon full depression of the shutter button. Flash mode may be selectively generated either in response to the light sensor 40 or a manual input from the user of the camera.

The image capture device 60 digitally records acquired images in colour. The image capture device is known to those familiar with the art and may include a CCD (charge coupled device) or CMOS to facilitate digital recording. High resolution images recorded by image capture device 60 is stored in an image store 80 which may comprise computer memory such a dynamic random access memory or a non-volatile memory. The camera is equipped with a display 100, such as an LCD, both for displaying preview images and displaying a user interface for camera control software.

In the case of preview images which are generated in the pre-capture mode 32 with the shutter button half-pressed, the display 100 can assist the user in composing the image, as well as being used to determine focusing and exposure. Temporary storage 82 is used to store one or plurality of the stream of preview images and can be part of the image store 80 or a separate component. The preview image is usually generated by the image capture device 60. For speed and memory efficiency reasons, preview images may have a lower pixel resolution than the main image taken when the shutter button is fully depressed, and can be generated by sub-sampling a raw captured image using software 124 which can be part of the general processor 120 or dedicated hardware or combination thereof.

In the present embodiment, a face detection and tracking module 130 such as described for example, PCT Publication No. WO2008/018887 (Ref: FN-143), is operably connected to the sub-sampler 124 to control the sub-sampled resolution of the preview images in accordance with the requirements of the face detection and tracking module. Preview images stored in temporary storage 82 are available to the module 130 which records the locations of faces tracked and detected in the preview image stream. In one embodiment, the module 130 is operably connected to the display 100 so that boundaries of detected and tracked face regions can be superimposed on the display around the faces during preview.

In FIG. 1, the face tracking module 130 is arranged to extract and store tracked facial regions at relatively low resolution in a memory buffer such as memory 82 and possibly for storage as meta-data in an acquired image header stored in memory 80. Where multiple face regions are tracked, a buffer is established for each tracked face region. These buffers are of finite size (10-20 extracted face regions in a preferred embodiment) and generally operate on a first-in-first-out (FIFO) basis.

The device 20 can further include an image correction module 90 which may perform post processing of any acquired images. Where the module 90 is arranged for off-line correction of acquired images in an external processing device 10, such as a desktop computer, a colour printer or a photo kiosk, face regions detected and/or tracked in preview images are preferably stored as meta-data within the image header. However, where the module 90 is implemented within the camera 20, it can have direct access to the buffer 82 where preview images and/or face region information is stored.

The module 90 can thus receive the captured high resolution digital images from the store 80 and analyze these to improve the quality of the image. The module can modify the image and the modified image may be either displayed on image display 100, saved on a persistent storage 112 which can be internal or a removable storage such as CF card, SD card or the like, or downloaded to another device via image output means 110 which can be tethered or wireless. The module 90 can be brought into operation either automatically each time an image is captured, or upon user demand via input 30. Although illustrated as a separate item, where the module 90 is part of the camera, it may be implemented by suitable software on the processor 120.

In embodiments of the present invention, the image acquisition device provides a HDR mode 72 selectable by the user of the image acquisition device 20. Typically, HDR mode is chosen as an alternative to a non-flash automatic exposure mode; or a flash exposure mode; or indeed any number of other specialised image acquisition modes such as portrait or panorama modes.

Figure 2:
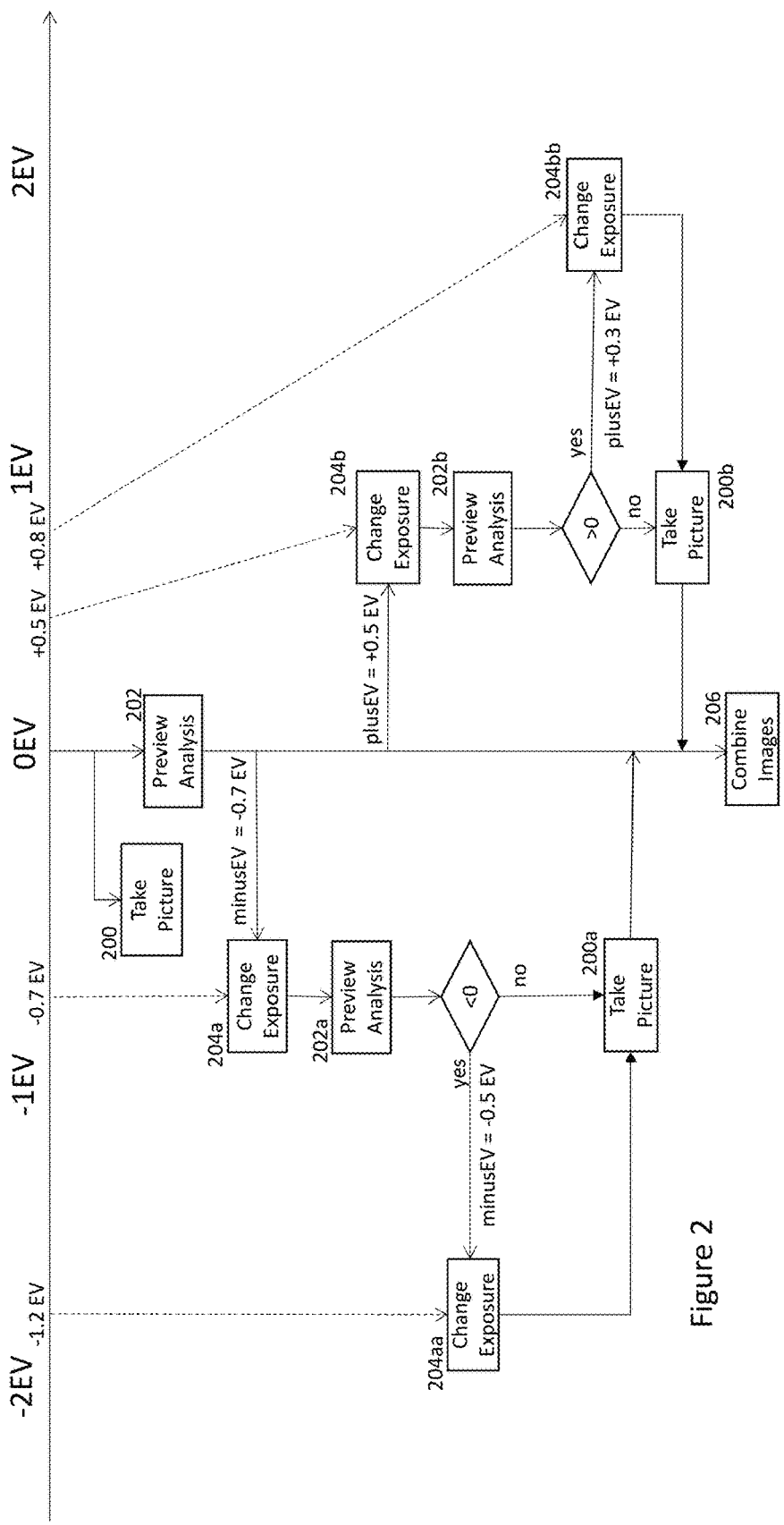
FIG. 2 is a flow diagram illustrating an image acquisition method operable on a device such as shown in FIG. 1.

Referring to FIG. 2, the mode is typically implemented by the processor 120 as follows: An image of a scene is captured at a nominal exposure level (0EV), step 200. The 0EV exposure level for this image can be determined based on an average light level of a scene provided by the light sensor 40; or can be determined based on spot metering of the scene; or can be determined based on a exposure level of for example, one or more face regions detected within the scene by the face tracker 130.

The 0EV image can be a preview image and displayed on the image display 100 as normal. Once the 0EV image is acquired, it is analysed in step 202 to determine the exposure levels for the remaining component images to be used in producing a HDR image.

This analysis first of all comprises computing a histogram of pixel intensities for the 0EV image. It will be appreciated that this technique lends itself to processing images in formats where intensity is provided in a separate image plane. Nonetheless, images can be acquired in any number of formats including RGB, LAB, YCC, YUV etc. In some cases such as LAB, YCC or YUV, one of the colour planes L or Y provides an intensity value 0≤Intensity≤Maxlevel, typically 255 for 8 bit pixels, directly, whereas for others such as RGB, colour plane information needs to be combined or transformed to provide an intensity value, for example, Intensity=0.2126*R+0.7152*G+0.0722*B.

Referring now to FIG. 3(*b*), a histogram for an image (histImg) acquired from a typical scene is shown.

The analysis now uses respective dark and light thresholding (or weighting) curves (curveDark, curveLight), FIG. 3(*a*), each curve ranging in value from 0 to 1, to obtain a measure of the extent of dark and burned areas within the image.

In the example, the dark thresholding curve (curveDark) is zero valued above a relatively low corner intensity value (DT) and increases in value towards 1 at zero intensity. Conversely, the light thresholding curve (curveLight) is zero valued below a relatively high corner intensity value (LT) and increases in value towards 1 at maximum intensity (in this case 255). Each curve increases monotonically with a first low inflection point and a second higher inflection point, with curve values tending to plateau as they increase towards 1. As such, each of curveDark and curveLight can be thought of as low pass and high pass filters for image histogram information.

The thresholding curves are based on the observation that in a well illuminated scene most pixel intensity values are the middle of the range. Some well illuminated scenes can still include dark and light pixels, but these should be relatively low in frequency, and need not necessarily cause a dynamic range problem.

If DT and LT alone were used as simple thresholding values for determining the number of dark and bright pixels in an image and to provide indicators of the relative darkness or lightness of an image, then exposure adjustments for images including normally occurring dark and bright pixels would tend to be too great. The thresholding curves of FIG. 3(*a*) therefore tend to limit the effect of most bright and most dark pixels on the exposure adjustments which may be made for additional component images.

By multiplying the values for histImg against curveDark and curveLight as follows:

$$darkPrc = W_D * \Sigma_{i=0}^{255}(histImg_i * curveDark_i)$$

$$lightPrc = W_L * \Sigma_{i=0}^{255}(histImg_i * curveLight_i)$$

respective measures of the extent of dark areas within the image (indicated as Dark Areas in FIG. 3(b)) and light areas within the image (indicated as Burned Areas in FIG. 3(b)) can be provided. In the example, a weight $W_D = W_L = 100$ is used to scale the summed values and can be dependent on the profile of the thresholding curves. For example $W_D * \int curveDark = W_L * \int curveLight = 1$. In the example of FIG. 3(b), the region indicated as "dark areas" illustrates the product of histImg and curveDark; while the region indicated as "burned areas" illustrates the product of histImg and curveLight. The values for these regions are summed (integrated) and scaled to provide darkPrc, lightPrc.

In the example, of FIG. 3(b), burned areas indicates a greater amount of saturated image area than dark areas.

These resultant values darkPrc and lightPrc are now used as lookup values to determine an initial plusEV and minusEV adjustment for two component images to be subsequently acquired as follows:

$$minusEV = -minusCurve(lightPrc);$$

$$plusEV = plusCurve(darkPrc);$$

The values within the lookup table are determined experimentally and increase in proportion to the darkPrc and lightPrc figures respectively. It will be noted that for a given area of dark pixels (darkPrc), the absolute value of the overexposure adjustment level (plusEV) will be less than the absolute value of the underexposure adjustment level (minusEV) for the same area of bright pixels (lightPrc).

Referring back to FIG. 2, in the example, a minusEV of −0.7 and a plusEV of 0.5 are determined for an 0EV image. Exposure settings are adjusted accordingly and a respective preview image can be captured at each of these settings 204a, 204b; or indeed a relatively short exposure time (SET) image can be acquired at the minusEV setting and exposure allowed to continue without clearing the sensor before acquiring a longer exposure time (LET) image at the plusEV setting.

As an alternative or in addition to adjusting exposure time, if the image acquisition device 20 comprises an adjustable aperture, then aperture stop can also be adjusted to adjust the exposure of the images captured in steps 204a and 204b. However, in this case such images would have to be acquired successively.

Each of the SET and LET images are then analysed in the same manner as the 0EV image in steps 202a and 202b, except in the case of the SET image, only lightPrc is of concern; whereas for the LET image, only darkPrc is of concern.

If the analysis 202a of the SET image provides lightPrc with an absolute value >0, then the minusEV value is adjusted further, step 204aa.

Similarly, if the analysis 202b of the SET image provides darkPrc with an absolute value >0, then the plusEV value is adjusted further, step 204bb.

In the example, the final minusEV and plusEV values are chosen as −1.2EV and +0.8EV respectively.

Now each of a final minusEV and plusEV image are acquired at steps 200a and 200b respectively. Again, the minusEV image can be acquired at the minusEV setting and exposure allowed to continue without clearing the sensor before acquiring the longer exposure time plusEV image at the plusEV setting. In this case, each of the minusEV, a second 0EV and plusEV images can be acquired successively from the sensor to mitigate problems with blur or ghosting between the minusEV and plusEV images and the 0EV image acquired at step 200.

Again, as an alternative or in addition to adjusting exposure time, if the image acquisition device 20 comprises an adjustable aperture, then aperture stop can also be adjusted to adjust the exposure of the images captured in steps 200a and 200b. Again, in this case such images would have to be acquired successively.

In this case, where the 0EV image acquired at step 200 is not used as a component image in HDR processing, a full resolution image need not be captured at step 200.

Where the minusEV and plusEV images are acquired separately, each of the 0EV and these images may need to be aligned before they can be combined into a HDR image and there can be problems with motion blur where these is movement within a scene.

On the other hand, where the minusEV and plusEV and possibly 0EV images are acquired substantially contemporaneously, ghosting artefacts can arise and special processing may be required to deal with these artefacts.

In any case, once the 0EV, minusEV and plusEV component images are available, they can be combined at step 206 into a HDR image. This processing can be performed immediately so that the HDR image can be viewed immediately on the acquisition device 20, or for example, the processing can be performed with a post processing module such as the correction module 90.

It will be appreciated that where the relatively short exposure time and relatively long exposure time images acquired in steps 204a and 204b are full resolution images, these could also be retained for use as component images of a HDR image.

It will be appreciated that each of the analysis steps 202, 202a and 202b need not analyse every pixel of an input image. So for example, if a full-resolution preview image has been acquired, it can be sub-sampled for the purposes of determining minusEV and plusEV. In any case, it will be seen that the above technique enables an image acquisition device to quickly acquire a minimal set of HDR images at suitable exposure settings for subsequent use in creating a HDR image.

The invention claimed is:

1. A system comprising:
   one or more processors;
   an image sensor;
   memory comprising computer executable instructions that, when executed by the one or more processors, cause the system to perform operations comprising:
      obtaining a first image via the image sensor based at least in part on a first exposure level;
      identifying a first set of pixels of the first image based at least in part on a light thresholding curve and first intensities associated with the first set of pixels;
      identifying a second set of pixels of the first image based at least in part on a dark threshold curve and second intensities associated with the second set of pixels;
      determining an underexposure adjustment level based at least in part on the first set of pixels;
      determining an overexposure adjustment level based at least in part on the second set of pixels;

obtaining, via the image sensor, a second image based at least in part on the underexposure adjustment level; and obtaining, via the image sensor, a third image based at least in part on the overexposure adjustment level.

2. The system of claim 1, wherein obtaining the first image comprises:
obtaining an image via the image sensor; and
sub-sampling the image to obtain the first image.

3. The system of claim 1, wherein determining the underexposure adjustment level comprises:
obtaining a fourth image via the image sensor based at least in part on the first exposure level and the underexposure adjustment level;
sub-sampling the fourth image; and
modifying, based at least in part on the first set of pixels, the underexposure adjustment level.

4. The system of claim 1, wherein determining the overexposure adjustment level comprises:
obtaining a fourth image via the image sensor based at least in part on the first exposure level and the overexposure adjustment level;
sub-sampling the fourth image; and
modifying, based at least in part on the second set of pixels, the overexposure adjustment level.

5. The system of claim 1, wherein:
determining the underexposure adjustment level comprises:
filtering a histogram associated with the first image based at least in part on the light thresholding curve to obtain a first filtered histogram,
and integrating the first filtered histogram;
determining the overexposure adjustment level comprises:
filtering the histogram associated with the first image based at least in part on the dark thresholding curve to obtain a second filtered histogram, and
integrating the second filtered histogram; and
the histogram comprises luminance values associated with pixels of the first image.

6. The system of claim 1, wherein the operations further comprise generating a high dynamic range (HDR) image based at least in part on the second image and the third image.

7. The system of claim 1, wherein the light thresholding curve is based at least in part on a high pass filter and the dark thresholding curve comprises is based at least in part on a low pass filter.

8. The system of claim 7, wherein:
a first corner frequency of the low pass filter is less than twenty percent of a maximum intensity indicatable by an intensity value associated with a pixel; and
a second corner frequency of the high pass filter is more than seventy-eight percent of the maximum intensity.

9. A method comprising:
obtaining a first image via an image sensor based at least in part on a first exposure level;
identifying a first set of pixels of the first image based at least in part on a high pass filter and first intensities associated with the first set of pixels;
identifying a second set of pixels of the first image based at least in part on a low pass filter and second intensities associated with the second set of pixels;
determining an underexposure adjustment level based at least in part on the first set of pixels;
determining an overexposure adjustment level based at least in part on the second set of pixels;

obtaining, via the image sensor, a second image based at least in part on the underexposure adjustment level; and
obtaining, via the image sensor, a third image based at least in part on the overexposure adjustment level.

10. The method of claim 9, wherein determining the underexposure adjustment level comprises:
obtaining a fourth image via the image sensor based at least in part on the first exposure level and the underexposure adjustment level;
sub-sampling the fourth image; and
modifying, based at least in part on the first set of pixels, the underexposure adjustment level.

11. The method of claim 9, wherein determining the overexposure adjustment level comprises:
obtaining a fourth image via the image sensor based at least in part on the first exposure level and the overexposure adjustment level;
sub-sampling the fourth image; and
modifying, based at least in part on the second set of pixels, the overexposure adjustment level.

12. The method of claim 9, wherein:
determining the underexposure adjustment level comprises:
filtering a histogram associated with the first image based at least in part on the light thresholding curve to obtain a first filtered histogram, and
integrating the first filtered histogram;
determining the overexposure adjustment level comprises:
filtering the histogram associated with the first image based at least in part on the dark thresholding curve to obtain a second filtered histogram, and
integrating the second filtered histogram; and
the histogram comprises luminance values associated with pixels of the first image.

13. The method of claim 9, further comprising generating a high dynamic range (HDR) image based at least in part on the second image and the third image.

14. The method of claim 9, wherein:
a first corner frequency of the low pass filter is less than twenty percent of a maximum intensity indicatable by an intensity value associated with a pixel; and
a second corner frequency of the high pass filter is more than seventy-eight percent of the maximum intensity.

15. A non-transitory computer-readable medium comprising processor-executable instructions that, when executed by one or more processors, cause the one or more processors to perform operations comprising:
obtaining a first image via an image sensor based at least in part on a first exposure level;
identifying a first set of pixels of the first image based at least in part on a high pass filter and first intensities associated with the first set of pixels;
identifying a second set of pixels of the first image based at least in part on a low pass filter and second intensities associated with the second set of pixels;
determining an underexposure adjustment level based at least in part on the first set of pixels;
determining an overexposure adjustment level based at least in part on the second set of pixels;
obtaining, via the image sensor, a second image based at least in part on the underexposure adjustment level; and
obtaining, via the image sensor, a third image based at least in part on the overexposure adjustment level.

16. The non-transitory computer-readable medium of claim 15, wherein determining the underexposure adjustment level comprises:

obtaining a fourth image via the image sensor based at least in part on the first exposure level and the underexposure adjustment level;

sub-sampling the fourth image; and modifying, based at least in part on the first set of pixels, the underexposure adjustment level.

17. The non-transitory computer-readable medium of claim 15, wherein determining the overexposure adjustment level comprises:

obtaining a fourth image via the image sensor based at least in part on the first exposure level and the overexposure adjustment level;

sub-sampling the fourth image; and modifying, based at least in part on the second set of pixels, the overexposure adjustment level.

18. The non-transitory computer-readable medium of claim 15, wherein:

determining the underexposure adjustment level comprises:

filtering a histogram associated with the first image based at least in part on the light thresholding curve to obtain a first filtered histogram, and integrating the first filtered histogram;

determining the overexposure adjustment level comprises:

filtering the histogram associated with the first image based at least in part on the dark thresholding curve to obtain a second filtered histogram, and integrating the second filtered histogram; and the histogram comprises luminance values associated with pixels of the first image.

19. The non-transitory computer-readable medium of claim 15, further comprising generating a high dynamic range (HDR) image based at least in part on the second image and the third image.

20. The non-transitory computer-readable medium of claim 15, wherein:

a first corner frequency of the low pass filter is less than twenty percent of a maximum intensity indicatable by an intensity value associated with a pixel; and a second corner frequency of the high pass filter is more than seventy-eight percent of the maximum intensity.

* * * * *